(12) United States Patent
Renard et al.

(10) Patent No.: US 10,124,511 B2
(45) Date of Patent: Nov. 13, 2018

(54) MODIFIED TIRE SEALANT MIXING DEVICE

(71) Applicant: The Goodyear Tire & Rubber Company, Akron, OH (US)

(72) Inventors: Philippe Nicolas Joseph Renard, Wiltz (LU); Giorgio Agostini, Colmar-Berg (LU); Jean Luc Dheur, Arlon (BE); Nicolas Robert Verdon, Aach (DE); Patrycja Polinska, Mersch (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 15/964,705

(22) Filed: Apr. 27, 2018

(65) Prior Publication Data

US 2018/0243945 A1 Aug. 30, 2018

Related U.S. Application Data

(63) Continuation of application No. 14/965,998, filed on Dec. 11, 2015.

(51) Int. Cl.
*B29B 7/00* (2006.01)
*B29B 7/48* (2006.01)
(Continued)

(52) U.S. Cl.
CPC ............. *B29B 7/48* (2013.01); *B29B 7/20* (2013.01); *B29B 7/26* (2013.01); *B29B 7/484* (2013.01); *B29B 7/489* (2013.01); *B29B 7/582* (2013.01); *B29B 7/60* (2013.01); *B29B 7/7495* (2013.01); *B29C 47/1063* (2013.01); *B29C 47/1081* (2013.01); *B29C 47/0004* (2013.01); *B29C 47/0016* (2013.01); *B29C 47/0822* (2013.01); *B29C 47/109* (2013.01); *B29C 47/12* (2013.01);
(Continued)

(58) Field of Classification Search
CPC .......... B29B 7/48; B29B 7/484; B29B 7/489; B29B 7/582; B29B 7/60; B29B 7/7495; B29C 47/1063; B29C 47/1081; B29C 47/0004; B29C 14/0016; B29C 47/0822; B29C 47/109; B29C 47/12; B29C 47/402; B29C 47/6012; B29C 73/163; B29K 2021/00
See application file for complete search history.

(56) References Cited

U.S. PATENT DOCUMENTS 6,129,450 A 10/2000 Braun
7,556,419 B2 * 7/2009 Colombo .............. B29C 47/402
366/77
(Continued)

*Primary Examiner* — Anshu Bhatia
(74) *Attorney, Agent, or Firm* — John D. DeLong

(57) ABSTRACT

A mixing and extrusion machine for tire sealant materials of the type comprising: a dump extruder equipped with conical converging twin screws located in a batching chamber, said chamber having a low pressure feeding area and a high pressure ducted area; a removable blind flange for temporarily sealing the outlet of said batching chamber so that said material is forced to recirculate between said duct area and said feeding area within said batching chamber, said chamber thereby also acting as a compounding chamber; and an inlet port located in the high pressure ducted area, the inlet port capable of introducing a diluent during mixing of a tire sealant material.

8 Claims, 2 Drawing Sheets

(51) Int. Cl.
*B29B 7/58* (2006.01)
*B29B 7/60* (2006.01)
*B29B 7/74* (2006.01)
*B29C 47/10* (2006.01)
*B29B 7/20* (2006.01)
*B29B 7/26* (2006.01)
*B29C 73/16* (2006.01)
*B29K 21/00* (2006.01)
*B29C 47/00* (2006.01)
*B29C 47/08* (2006.01)
*B29C 47/12* (2006.01)
*B29C 47/40* (2006.01)
*B29C 47/60* (2006.01)

(52) U.S. Cl.
CPC ........ *B29C 47/402* (2013.01); *B29C 47/6012* (2013.01); *B29C 73/163* (2013.01); *B29K 2021/00* (2013.01); *B29K 2021/003* (2013.01)

(56) References Cited

U.S. PATENT DOCUMENTS

| | | |
|---|---|---|
| 8,770,824 B2 | 7/2014 | Nogata et al. |
| 2006/0140048 A1 | 6/2006 | Ulzheimer et al. |
| 2011/0146883 A1 | 6/2011 | Burg |
| 2013/0161857 A1 | 6/2013 | Milan et al. |
| 2017/0297281 A1* | 10/2017 | Yukawa .................. B29C 73/22 |

* cited by examiner

MODIFIED TIRE SEALANT MIXING DEVICE

BACKGROUND

The mixing of rubber compounds may be done in various devices, including Banbury®-type mixers, extruders, and the like. A specific type of mixer is the conical twin screw extruder, also known as a dump extruder or conical mixer, as disclosed in U.S. Pat. No. 7,556,419.

Tire sealant materials are rubber compounds including a variety of components, including a high volume of relatively low viscosity diluent, such as oil or low molecular weight polymer. Complete mixing of the diluent with the remaining ingredients in prior art conical mixers is difficult, leading to incomplete mixing with large amounts of unincorporated diluent.

It would then be desirable to have a conical mixer that provides an improved mixing of tire sealant materials.

SUMMARY

The present invention is directed to a mixing and extrusion machine for tire sealant materials of the type comprising:

a dump extruder equipped with conical converging twin screws located in a batching chamber, said chamber having a low pressure feeding area and a high pressure ducted area;

a removable blind flange for temporarily sealing the outlet of said batching chamber so that said material is forced to recirculate between said duct area and said feeding area within said batching chamber, said chamber thereby also acting as a compounding chamber; and an inlet port located in the high pressure ducted area, the inlet port capable of introducing a diluent during mixing of a tire sealant material.

DESCRIPTION

There is disclosed a mixing and extrusion machine for tire sealant materials of the type comprising:

a dump extruder equipped with conical converging twin screws located in a batching chamber, said chamber having a low pressure feeding area and a high pressure ducted area;

a removable blind flange for temporarily sealing the outlet of said batching chamber so that said material is forced to recirculate between said duct area and said feeding area within said batching chamber, said chamber thereby also acting as a compounding chamber; and an inlet port located in the high pressure ducted area, the inlet port capable of introducing a diluent during mixing of a tire sealant material.

Figure 1:
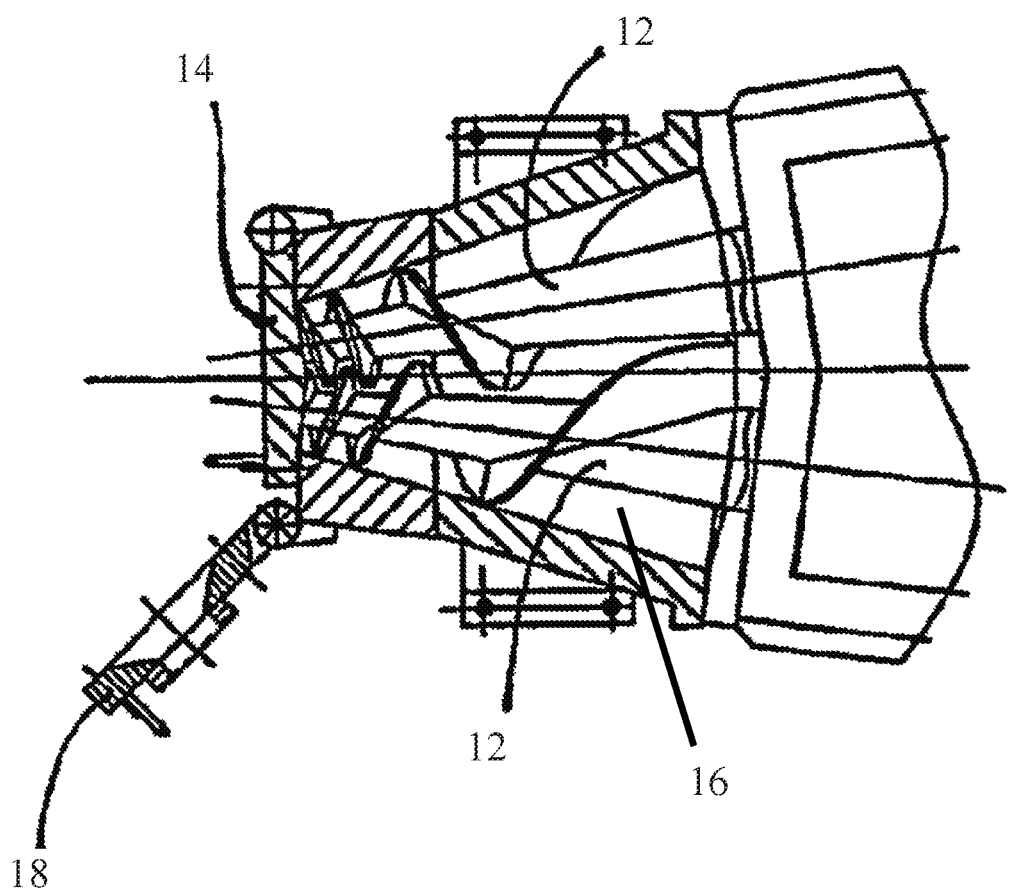
FIG. 1 shows a top view of a mixer according to the present invention.

FIG. 1 illustrates a top view of a conical mixer. Conical mixers as disclosed for example in U.S. Pat. No. 7,556,419 are available from Colmec S.p.A., Busto Arsizio, Italy.

With reference now to FIG. 1, mixer 10 includes two intermeshing conical screws 12 located in batching chamber 16. Conical screws 12 converge towards outlet 14 of the batching chamber 16. Conical screws 12 driven to rotate by a motor (not shown) in counter-rotation mode. Sealing flange 18 (shown in the open position) is used to close outlet 14 and allow mixing of added materials (such as tire sealant components) 16 in the batching chamber 16.

Figure 2:
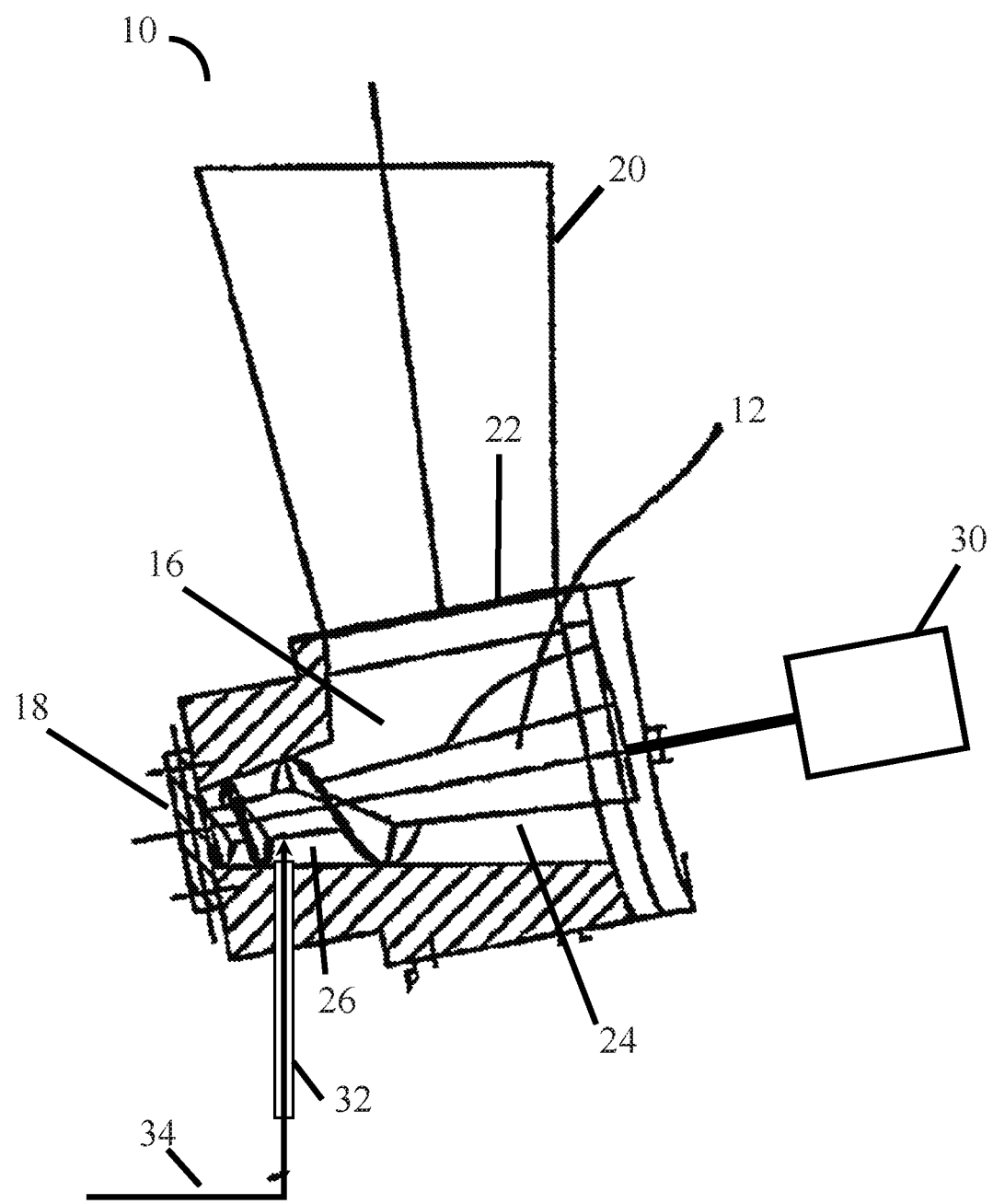
FIG. 2 shows a side view of a mixer according to the present invention.

FIG. 2 shows a side view of the mixer 10 with sealing flange 18 in the closed position. Batching chamber 16 opens towards feedbox 20 through feed opening 22. Batching chamber 16 includes feeding zone 24 located adjacent to feedbox 20, and ducted zone 26 located adjacent to outlet 14. Conical screws 12 taper along a direction starting in feeding zone 24 towards ducted area 24. Conical screws 12 have a higher pitch and higher channel depth in the feeding zone 24, and a lower pitch and lower channel depth in the ducted zone 26, that is, pitch and channel depth of the screws tapers from feeding zone 26 towards ducted zone 26. Conical screws 12 are rotated by motor 30 through an engaging mechanism (not shown). With the outlet of the mixer closed as shown in FIG. 2, material introduced through the feedbox 20 is forced to recirculate inside the batching chamber 16 during counter-rotation and intermeshing of the conical screws 12.

During operation, with sealing flange 18 closed as shown in FIG. 2, materials to be mixed into a rubber compound are loaded through feedbox 20 and fed into batching chamber 16. Counter-rotation of conical screws 12 pushes material to be mixed towards closed outlet 14 and sealing flange 18. Sealing flange 18 forces the material to recirculate from ducted zone 26 backwards towards feeding zone 24. An increasing pressure gradient is so obtained between feeding area 24, at low pressure, and a ducted zone 26 near the blind flange, at high pressure. The recirculation of the material between variable pressure areas allows mixing of the compound.

Inlet port 32 is located in ducted zone 26. Inlet port 26 allows introduction of a relatively low viscosity diluent 34 such as oil or liquid polymer into to ducted zone 26 during rotation of conical screws 12 and mixing of the material. Inlet port 32 may be constructed from a tube, pipe, or other conduit mounted to mixer 10 such that externally supplied diluent 34 flowing through port 32 may be in fluid communication with ducted zone 26. Inlet port 32 is constructed so as to withstand the applied pressure of the diluent using fabrication techniques as are known in the art.

The introduction of the diluent 34 into the high pressure ducted zone 26 through inlet port 26 requires the diluent 34 to be pressurized; the diluent pressure must be higher than pressure of the material being mixed in the ducted zone 26 otherwise the material will flow into the port 26. Diluent 34 is pressurized using pressurization equipment (not shown) external to the mixer 10.

The inlet port 34 is equipped with a closing gate (not shown) that is operable to allow injection of the diluent during a part of the mixing cycle. The diluent is pressurized before the opening of the gate (not shown) and must remain pressurized until the gate is closed at the completion of diluent injection.

After mixing, a valve (not shown) in sealing flange 18 is opened and conical screws 12 in rotation push the compound through the valve (not shown).

The mixer 10 allows the production of rubber compounds such as tire sealant from raw materials added individually to the mixer (polymers, fillers, curatives, oils, etc.). Alternatively, the mixer 10 may be used to mix diluent with a master batch mixed in a mixing process external to the mixer 10. In particular, it is the mixing of a master batch with diluent that is advantageous in the mixer 10.

Various advantages are seen in using masterbatches such as facilitating the dosing of various components, control of dust, and delaying cure. A master batch may contain for example rubber, oil, carbon black and part of curatives, and none or a small part of the diluent, however, it has been observed that the mixing time is 50% to 100% longer when a masterbatch is used in a prior art conical mixer (i.e. a mixer as disclosed for example in U.S. Pat. No. 7,556,419) compared to mixing individually added components.

The extension of the mixing time for a master batch in a prior art mixer is believed to be related to the difficulty to incorporate the lower viscosity diluent into the higher viscosity masterbatch compound. In the prior art mixer, diluent is added on top of the masterbatch compound being mixed into the feeding zone. At some point during the addition of the diluent, the diluent and mixed compound falls into two phases, the first phase is constituted of rubber agglomerates having a size of 3 to 5 cm surrounded by a second phase of liquid diluent. When the batch becomes such a two phase system, it is observed that the amperage of the drive motor falls by 20 to 60% indicating a loss of mixing efficiency.

Simulation studies have shown that the shear forces are the lowest in the feeding zone of mixing chamber, the materials velocity and the pressure are also the lowest in this area. The simulation has also shown that there is only a moderate exchange of materials between the ducted zone where velocity and pressure are high and the feeding zone where velocity and pressure are low.

Addition of the inlet port 32 in the ducted zone allows for a modification of the injection point of the diluent as compared with the prior art. Instead of adding diluent on top of the mixing compound in the feeding zone of the mixing chamber, the injection point is to be placed in the high pressure, ducted zone.

Simulation studies have shown that there is a forward motion of material in the ducted zone area forcing the compounds into the area where the pressure and the velocity are the highest. Introducing diluent at the entry of the area with the highest velocity and pressure facilitates the incorporation of diluent by the mixing compound and thus improves the dispersion of the diluent and reduce the cycle time.

The sealant composition may be comprised of any of various sealant compositions as are known in the art. In one embodiment, the sealant composition may include a variety of components, including at least one of an elastomer, a thermoplastic elastomer, an ionomer, a polybutene as diluent, an oil as diluent, and a tackifying resin. Curatives and fillers may also be included in the sealant as desired.

In one embodiment, the sealant comprises an elastomer and a liquid polymer or oil diluent, and suitable curative. Suitable sealant compositions of this type are disclosed in U.S. Pat. No. 6,303,694 and U.S. Pat. No. 8,821,982, both fully incorporated herein by reference. In particular, a sealant of this type comprises a butyl rubber, a polybutene, and a quinoid curing agent.

In one embodiment, from about 55 to about 90 percent by weight of the sealant composition is polybutene as the liquid diluent. Suitable polybutene has a number average molecular weight ranging from 500 to 5000, alternatively from 1290 to 2300, as determined by vapor pressure osmometry. Suitable polybutene has a viscosity ranging from 627 to 4382 centistokes at 210° F., as measured by the standard test ASTM D-445- 15, Standard Test for Kinematic Viscosity of Transparent and Opaque Liquids (and Calculation of Dynamic Viscosity), March 2015, ASTM International, West Conshohocken, PA, 2003, DOI:101520/D0445- 15.

In one embodiment, the sealant comprises a thermoplastic elastomer and a liquid polymer or oil diluent. Suitable sealant composition of this type are disclosed in U.S. Pat. Nos. 8,871,852; 8,573,271; 8,602,075; EP 2,125,949; and CN100594225. In particular, a sealant of this type comprises a SEBS (styrene/ethylene-butylene/styrene) thermoplastic elastomer, and a polybutene.

Following mixing of the sealant components in the mixer 10 and any required reaction and curing, the sealant composition is applied to the innerliner of a cured tire.

It is understood, however, that the invention is not limited to the specific embodiments illustrated above, which represent only non-limiting examples of the scope of the invention, but that a number of changes may be made, all within the reach of a skilled person in the field, without departing from the scope of the invention.

What is claimed is:

1. A method of making a tire sealant composition, comprising the steps of:
   adding components comprising an elastomer and curatives to a low pressure feeding area of a dumping extruder, the dump extruder equipped with conical converging twin screws located in a batching chamber, said chamber having the low pressure feeding area and a high pressure ducted area, a removable blind sealing flange for temporarily sealing an outlet of said batching chamber so that the added components are forced to recirculate between the high pressure ducted area and the feeding area within the batching chamber, the batching chamber thereby also acting as a compounding chamber; and
   adding a pressurized liquid diluent via an inlet port located in the high pressure ducted area;
   mixing the liquid diluent and the added components in the batching chamber to form the sealant composition.

2. The method of claim 1, wherein the inlet port comprises a closing gate.

3. The method of claim 1 wherein a front end of the conical screws grazes the blind sealing flange.

4. The method of claim 1, in which said conical screws are counterrotating.

5. The method of claim 1, wherein the liquid diluent is a polybutene.

6. The method of claim 5, wherein the sealant composition comprises from 55 to 90 percent by weight of the polybutene.

7. The method of claim 5, wherein the polybutene has a viscosity ranging from 627 to 4382 centistokes at 210° F.

8. The method of claim 1, wherein the elastomer comprises a butyl rubber and the curative comprises a quinoid curing agent.

* * * * *